R. R. MILLER.
ELECTRIC TRACK SWITCH.
APPLICATION FILED NOV. 30, 1910.
1,046,001.
Patented Dec. 3, 1912.
2 SHEETS—SHEET 1.
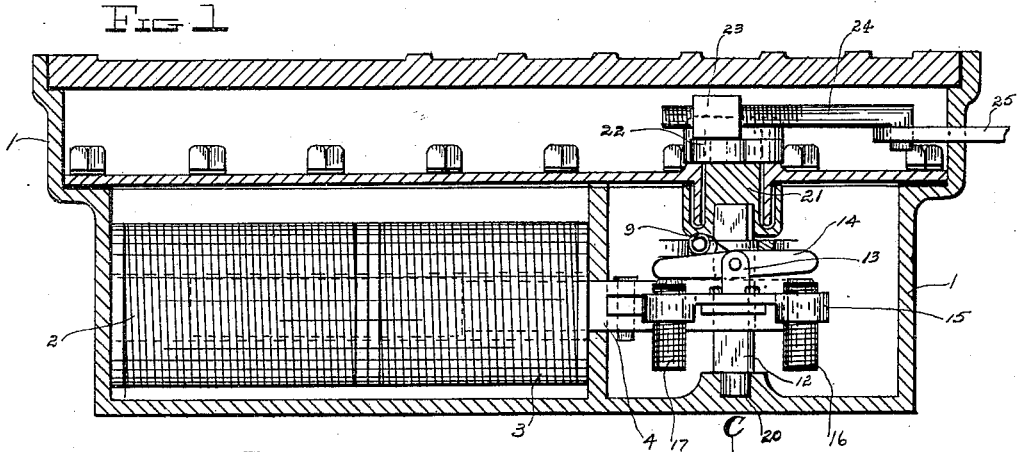
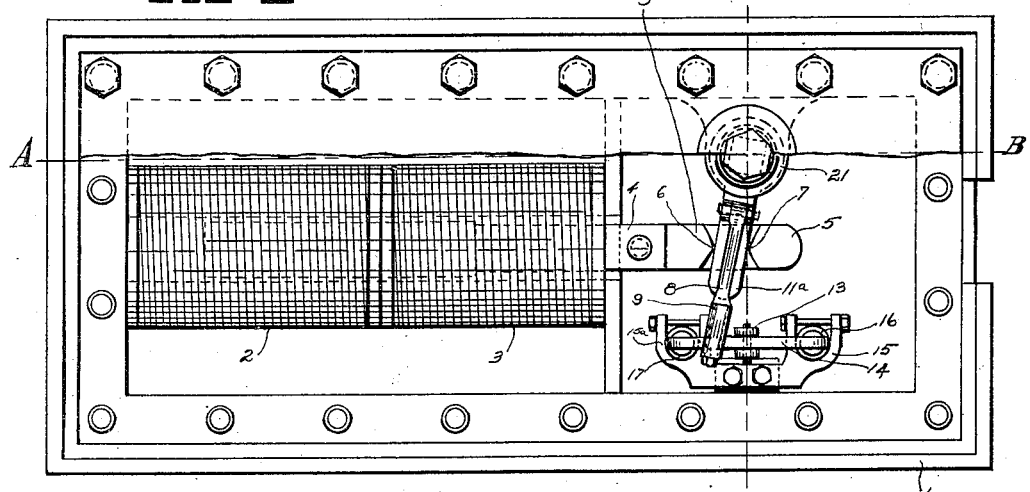
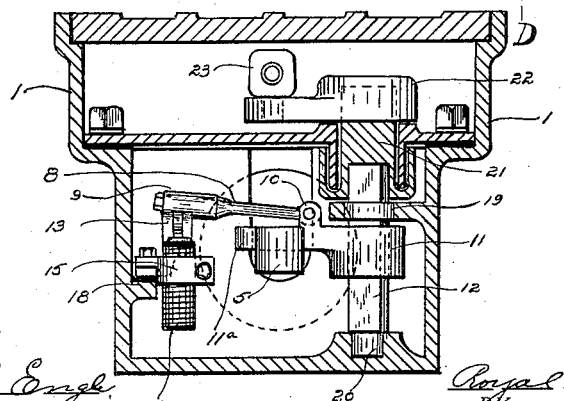
WITNESSES:
INVENTOR.
ATTORNEY.

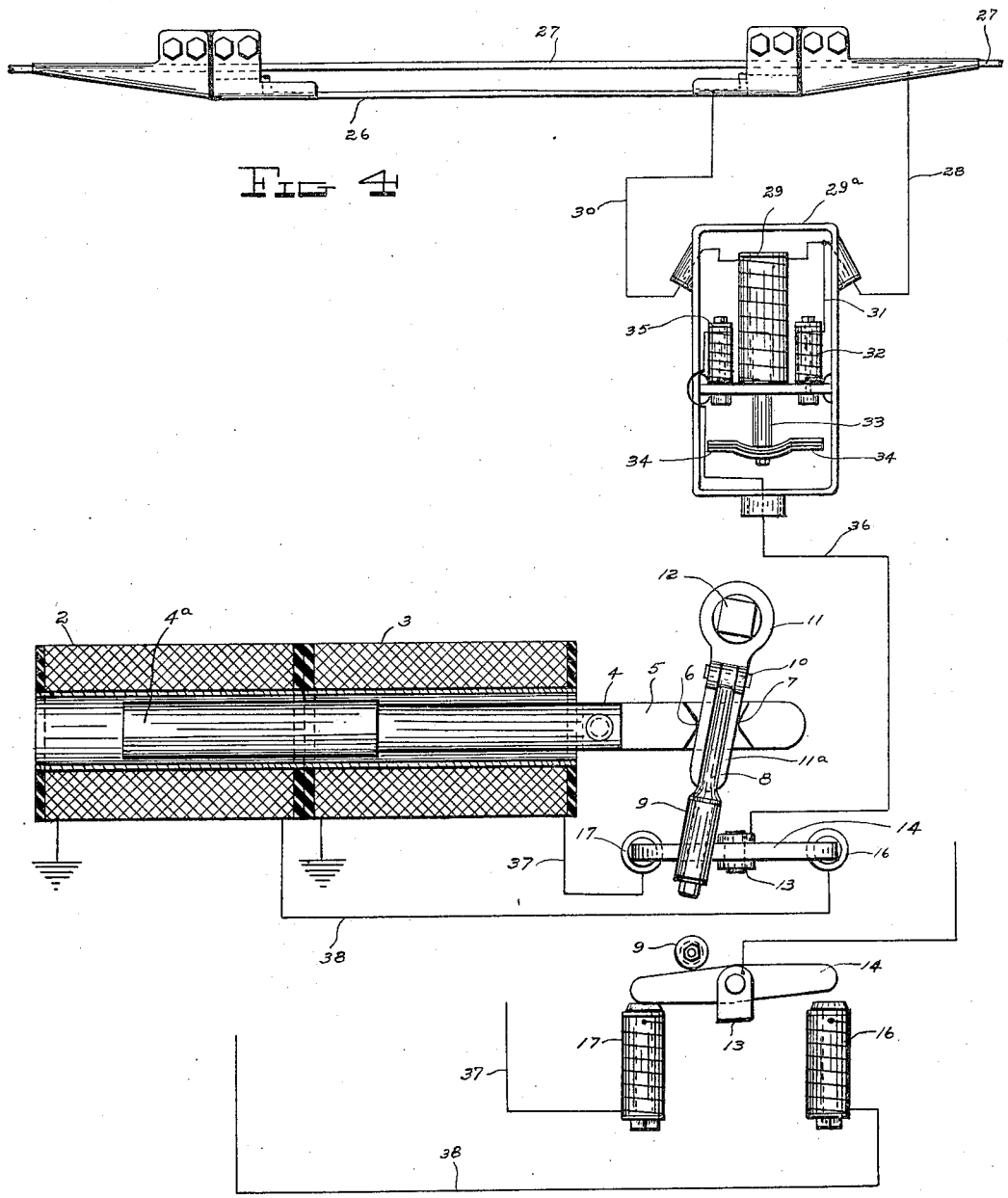

UNITED STATES PATENT OFFICE.

ROYAL RUEBEN MILLER, OF PUEBLO, COLORADO, ASSIGNOR OF ONE-HALF TO WILLARD C. DARBY, OF PUEBLO, COLORADO.

ELECTRIC TRACK-SWITCH.

1,046,001. Specification of Letters Patent. Patented Dec. 3, 1912.

Application filed November 30, 1910. Serial No. 594,997.

*To all whom it may concern:*

Be it known that I, ROYAL RUEBEN MILLER, a citizen of the United States, residing at Pueblo, Colorado, have invented certain new and useful Improvements in Electric Track-Switches, of which the following is a specification.

My invention relates to improvements in an electric track switch, and the objects of my invention are to provide a means for operating switches economically; to apply electromagnetic force; and to make more economical use of the electric current in throwing a switch. I attain these objects by the mechanisms illustrated in the accompanying drawings in which,—

Figure 1 is a side elevation of the device showing the same in a box with the side of the box broken away on the line A—B of Fig. 2; Fig. 2 is a plan view of the device in the box with the first lid removed and the second lid partly broken away; Fig. 3 is a front end view of the device in the box with the box broken away on the line C—D in Fig. 2; Fig. 4 is a view showing in elevation the trolley line, the insulated section thereof, and the relay coil; and in plan view the device with the various electrical connections; and Fig. 5 is a side elevation showing the circuit changing bar and magnetic coils.

Similar numerals refer to similar parts throughout the several drawings.

In a water tight box 1, that is provided with compartments and water tight lids, are placed in one of the compartments the solenoidal magnets 2 and 3 properly insulated. The plunger $4^a$ operates in said solenoidal magnets and is connected by non-magnetic arm 4 with the operating bar 5. On the exterior end of the operating arm 5 are provided the V shaped cams 6 and 7. A shaft 12 is provided, operative in bearings 19 and 20 on the box. Fixed on the shaft 12 is the lever 11 having an extended arm $11^a$ with the square sides fitting in the spaces between the cams 6 and 7 and operative therein. An element 10 is provided on the arm $11^a$ in which is pivotally attached the operating arm 8. This operating arm 8 is attached so as to reach the circuit changing bar 14 and is provided with a roller 9 of nonconducting material. The supports 15 and $15^a$ are attached to the bracket 18 in the box and carry the magnetic coils 16 and 17. Intermediate of supports 15 and $15^a$ the support 13 properly insulated is attached to the bracket 18, and may be a part of the supports 15 and $15^a$ and carries balanced pivotally therein the circuit changing bar 14. The magnetic coil 16 is connected by transmission means 38 with the solenoid 2, and the magnetic coil 17 is connected by transmission means 37 with the solenoid 3. The shaft 12 is connected with the cap 21 so as to operate the same and to this cap is attached the lever 22. Screw means 23 is provided at the end of the lever 22 in which is fixed the operating rod 24, and the rod 24 is pivotally attached to the throwing bar 25 that is connected to the switch tongue. The relay coil 29 is provided in a box $29^a$. In this box are also provided the blow coils 32 and 35. The plunger 33 operates on the inside of the relay coil 29 and has attached the arms 34. Electric connection 28 is attached to the trolley wire 27 and the other end is attached to the relay coil 29 with electric connection 31 attached to connection 28 and to coil 32. Electric transmission means 30 is attached to the coil 29 and to the insulated portion of the trolley wire 26. The coil 35 is connected by transmission means 36 with the circuit changing bar 14.

The operation of my device is as follows: When the trolley of the electric motor car enters the insulated section 26, if it is desired to operate the switch, the connection with the motors is permitted to remain on thus completing the circuit through the electric connection 28 and thence through the relay coil 29, and thence on through the connection 30 through the trolley and motors to the ground. As soon as the relay coil 29 has been energized it draws the plunger 33 up, and the arms 34 make the connection with the blow coils 32 and 35, and by reason of the connection 31 a shunt circuit passes through the coils 32 and 35 and thence by the transmission means 36 the current passes into the circuit changing bar 14. The switch being in such position as to cause the mechanism to have the position as shown in Fig. 4, the current passes through the said bar 14, the magnetic coil 17, and by transmission means 37 through the solenoid 3, and thence to the ground connections; thus the solenoid 3 is energized sufficiently to draw the plunger $4^a$ into the solenoid 3.

This operation drives the lever arm $11^a$ forward and turns the shaft 12, and through the means of the fixed cap 21 and lever 22, by means of the intermediate connections, forces the tongue of the switch into the opposite position from that occupied. While such last movement is taking place the operating arm 8 is carried forward on the circuit changing bar 14 moving the nonconducting roller 9 to the end of the bar 14 over the coil 16. As soon as the trolley has passed out of the insulated section 26 the current is broken at the relay coil 29 and the weight of the pivoted operating arm 8 forces down the circuit changing bar 14 that is balanced in the bearing 13 on the magnetic coil 16 leaving it in that position. The next time that it is desired to operate the switch and reverse the switch tongue from its position, the connection through the insulated section 26 is made by means of the current through the motor car, and the current operates through the magnetic coil 16 in the same manner as in the former description concerning the solenoid 3. The solenoid 2 is energized and the mechanism is actuated so as to pull the switch into the position illustrated in Fig. 4. It is plainly to be seen that so long as either the magnetic coil 16 or the magnetic coil 17 is energized, while the trolley is in the insulated section, that the end of the circuit changing bar 14 is held in contact by the electromagnetism until the electromagnet is released by the breaking of the current through the relay coil, and then the weight of the operating bar 8 forces the end of the circuit changing bar 14 down upon the magnetic coil over which the operating arm 8 may rest.

It will be noticed that by this construction, the placing of the solenoidal magnets end to end with a common plunger, produces a piston action utilized by the intermediate mechanical connections to operate the switch, and the operating arm 8 simplifies, in connection with the circuit changing bar 14, the means for switching the electric current into the desired solenoid. By use of the blow coils 32 and 35 in connection with the relay coil 29 a shunt circuit is provided for the operation of the mechanism, and the current is broken in the relay coil box 29ª which may be placed above ground in any desired position, thereby avoiding the breaking of the current in the box containing the solenoids and magnetic coils in the ground. The box 1 is placed in the ground at any desired position and may be made in general form as illustrated in the drawings or any desired form.

I do not confine myself to the exact construction as the same results may be obtained with slight variations, and especially may the same results be obtained by using insulating material for the circuit changing bar 14 providing therein connecting means to connect with the magnetic coils 16 and 17 and thus the insulated roller 9 by such construction could be avoided, but the same would be no departure from the principle of my invention.

I claim:—

1. In an electric track switch in which there are provided a trolley line with an insulated section, a relay coil carrying a plunger provided with extended arms, blow coils operative therewith, electric connection on said trolley through said relay coil to said insulated section and said blow coils, two magnetic coils, two solenoidal magnets placed adjacent end to end and connected with said magnetic coils, a plunger operative in said solenoidal magnets provided with a non-magnetic section carrying an operating bar provided with V shaped cam means, a shaft, a lever arm attached to said shaft the free end of which arm is adapted to operate in said cam means, and intermediate arms, rods and bars adapted to communicate motion from said shaft to a switch tongue, comprising an operating arm pivotally attached to said lever arm, a balanced circuit changing bar connected with said blow coils adapted to connect alternately with each of said magnetic coils and actuated by said operating arm, all substantially as set forth.

2. In an electric track switch of the character described, the combination of an insulated section in a trolley wire connected through relay coil means with the main trolley wire; an operative core in such relay coil provided with extended arms; a shunt circuit transmission means through said arms of said operative core; two solenoidal magnets end to end provided with a common core operative therein; mechanical means adapted to communicate the motion of last said operative core to a switch tongue; a lever arm in said mechanical means attached to a shaft therein; two magnetic coils connected respectively with said solenoidal magnets; with a balanced circuit changing bar in series with said shunt circuit disposed so as to be operatively connected alternately with each of said magnetic coils; and an operating arm pivotally attached to said lever arm adapted to actuate said circuit changing bar; all substantially as set forth.

Witness my signature.

ROYAL RUEBEN MILLER.

Witnesses:
 C. M. WALKER,
 MAUDE ENGLE.